United States Patent [19]

Wanlass

[11] 4,338,557

[45] Jul. 6, 1982

[54] VARIABLE SPEED ELECTRIC MACHINE HAVING CONTROLLED MAGNETIC FLUX DENSITY

[76] Inventor: Cravens L. Wanlass, 9871 Overhill Dr., Santa Ana, Calif. 92705

[21] Appl. No.: 66,411

[22] Filed: Aug. 14, 1979

[51] Int. Cl.³ .............................................. H02P 1/44
[52] U.S. Cl. ..................................... 318/729; 318/814; 310/166; 310/198
[58] Field of Search ........................ 318/752, 794–797, 318/738, 807, 729, 778, 814; 310/166, 172, 185, 197–207, 184

[56] References Cited

U.S. PATENT DOCUMENTS

| 2,039,050 | 4/1936 | Ball | 318/729 |
| 2,697,810 | 12/1954 | Hutchins et al. | 318/797 |
| 2,991,402 | 7/1961 | Imada et al. | 318/796 |
| 3,354,370 | 11/1967 | Corry et al. | 318/807 |
| 3,940,646 | 2/1976 | Buckman | 310/166 |

FOREIGN PATENT DOCUMENTS

462172 2/1951 Italy .

Primary Examiner—Gene Z. Rubinson
Attorney, Agent, or Firm—Lyon & Lyon

[57] ABSTRACT

In a polyphase machine, being either a motor or a generator, there is provided a stator core having main stator windings wound about the stator core and main windings having a capacitor connected in series with each winding of the core. Switches are provided for each winding, and a trigger source for the switches operates with the capacitor and windings to ensure sequential current flow in opposite directions across the windings. Variable frequency pulses from a trigger results in a variable speed machine. With control windings wound on the stator, oppositely to the main windings there are currents in each phase which are substantially in-phase at no load with the currents of the corresponding radially adjacent the main windings. Such currents become out of phase with their main winding currents as the load increases. At low load the net flux density is low and as the load increases the flux density increases. With the centers of the poles of the control windings placed as close as physically possible between the poles of the main windings, the magnetic centering of the poles is improved. The voltage across the capacitor added to the input voltage may cause the stator core to switch periodically between non-saturated and saturated conditions.

38 Claims, 5 Drawing Figures

VARIABLE SPEED ELECTRIC MACHINE HAVING CONTROLLED MAGNETIC FLUX DENSITY

RELATED APPLICATIONS

This is a related application to Ser. No. 790,758, filed Apr. 25, 1977, entitled POLYPHASE ELECTRIC MOTOR HAVING CONTROLLED MAGNETIC FLUX DENSITY, which is a continuation-in-part of Ser. No. 597,529, filed July 21, 1975, now being U.S. Pat. No. 4,063,135 and entitled ELECTRIC MOTOR HAVING CONTROLLED MAGNETIC FLUX DENSITY, the disclosures of which are incorporated by reference herein. The subject matter of this application also relates to the subject matter of applicant's co-pending application filed concurrently under Ser. No. 661,410. The subject matter of this application also relates to the subject matter of U.S. Pat. No. 4,152,630 entitled IMPROVED MULTI-PHASE MOTOR; U.S. Pat. No. 4,095,149 entitled OPTIMIZED ELECTRIC MOTOR HAVING CONTROLLED MAGNETIC FLUX DENSITY; the disclosures of which patents are incorporated by reference herein.

BACKGROUND OF THE INVENTION

This invention relates to the polyphase electric machines, being motors and generators. The invention is described with reference to motors, particularly three phase motors, but as indicated the invention is not so restricted.

A limitation of presently known induction motors is that, since speed of rotation is governed by the frequency of the A.C. supply and this frequency is fixed, it is not easy to vary the motor speed by such frequency variation. Complex and expensive circuits do exist for varying the frequency of the A.C. supply being fed to the stator of the induction motor, these circuits being located between the source and the motor winding. Conventionally, such motors require that the stator supply be a relatively pure sinusoidal wave in order to achieve efficient operation. Circuitry to achieve this, especially for high powered machinery is also complex and expensive. A more efficient usage of electrical power is achieved by having a motor which is speed variable according to load requirements in comparison with a motor which is operative at a relatively fixed speed or speeds or is otherwise stationary, depending on load requirements.

Another disadvantage with induction motors is that when heavily loaded, they draw excessive currents as the motor slows down, which currents can result in motor burn out unless the motor is protected by auxiliary equipment. Such motors must have a high breakaway torque to running torque ratio to prevent motor damage in the event of motor overload, as a result the flux density must be maintained at non-optimum levels during normal operation. This relatively low flux density during normal operation is also necessitated by potential input voltage variations. Because the flux density must be kept relatively low, the motor size must be substantially larger than would theoretically be necessary in an ideal motor in order to obtain the desired output horsepower.

Another problem encountered in conventional induction motors is the high starting current inherent to their operation. This also causes the flux density to be higher at low loads than is actually necessary for efficient operation at such loads.

Yet, another problem which is known to exist is that of designing a motor to run through its normal load range efficiently, to provide high power factor, and simultaneously to provide high starting torque and high breakdown torque when required for particular applications.

SUMMARY OF THE INVENTION

The present invention overcomes or reduces the foregoing disadvantages of electric machines by providing a capacitor in series with a stator winding thereby defining a series circuit. Connected with the main winding is switching means which operates in response to signals from an external trigger source, together with the capacitor and main winding to permit sequentially current flow in opposite directions. The switching means, capacitor and windings are fed by a source of D.C. voltage and this is converted by the series circuit, and switching means into a clipped A.C. square wave across the main winding. Frequency variation of the A.C. square wave is obtained by varying the frequency of the signal from the external trigger source, the signal preferably being discreet pulses.

The electric machines of the invention provides a system in which the magnetic flux density in the stator is maintained at optimum level for requisite load conditions. In addition, the system permits the current in the rotor also to be maintained at an optimum magnitude for requisite load conditions relative to those permitted in convention electric motors of the induction type, and the torque and horsepower of a motor for a given amount of magnetic material to be optimized.

In a polyphase motor, a main polyphase stator winding is wound on a magnetic core, the winding comprising a plurality of windings and each winding represents a single phase. Capacitors are connected to input terminals together with the respective main windings and the series connected capacitances.

Switching means is connected in series with the main winding and capacitor series circuit of each phase and this operates in response to an external trigger source which provides discreet pulses at a predetermined frequency thereby to create sequentially current flow in opposite directions, the capacitor and main winding sequentially turning off the current flow thereby creating an alternating voltage supply. In a three-phase motor, the external signal source triggers each phase at intervals of 120° phase difference thereby to provide an alternating current machine with a suitable three-phase supply. The speed of the motor is varied by changing the frequency of the pulses from the external trigger source.

The source of the supply to the external trigger may be a DC voltage or a conventional three-phase voltage supply suitably rectified, or a single phase supply suitably rectified.

There is also a control winding having a winding for each phase, each phase control winding and the main windings being oppositely wound such that on low load the total flux density from main and control windings substantially radially adjacent each other is low and with increasing load the total flux density increases as the flux generation of the windings become additive with each other.

The polyphase control winding wound on said core to encompass the magnetic material is connected to the input terminals and is positioned physically on the stator so that the vectorial relationship of the currents in the main windings and the currents of the control windings located substantially radially adjacent the main windings cause the vectorial sum of these respective currents to decrease as the load increases towards full load.

The capacitors have a value such that the voltage across the capacitors will, in combination with the input voltage, periodically cause the volt-second capacity of the stator core to be exceeded with the result that the core will periodically change non-linearly from high to low flux density conditions and back again. The average flux density in the stator core is thus maintained quite high without the danger of high input voltages resulting in extremely high input voltages resulting in extremely high input currents. The capacitors limit the amount of energy that can be transferred to the rotor even if the rotor has a very low impedance so rotor current can also be optimized. The rotor impedance can be made lower than in a conventional motor, and the curent induced at zero motor speed can be made more optimum than is conventional; yet this current will still have a proper value at normal motor operating speeds and normal loads. Thus, the motor of the present invention can be optimized much better than conventional motors for a large number of applications or for any given application.

In preferred forms, by using capacitors in series with the main stator winding and operating the motor magnetic path in soft saturation due to the limiting effect of total energy transfer of the capacitors, the end result is a motor that can be operated at optimized flux density under most conditions of line voltage without resulting in extremely high input currents for high input voltages. In other words, the input current and flux density in the machine would not be extremely non-linear as a function of the line voltage as is the case in standard induction and other motors. The present invention makes use of the fact that the inductances of the motor winding can only absorb so much energy before the magnetic material of the motor stator saturates and discharges the capacitors. When the motor magnetic material saturates, the capacitors discharge through the motor winding and the power line source and charge up the capacitors in the opposite polarity. The current through the winding then reverses and the capacitors are then the source of energy and maintain the current flowing through the windings. This continues until the voltage of the input line changes in polarity. The volt-seconds of the input voltage from the line then adds to the volt-seconds that have been applied by the capacitors to the main windings. This continues until the total voltage-second applied to the main winding exceeds the volt-second capacity of the windings and magnetic material of the motor stator, and then the magnetic material of the motor again saturates. The capacitors then discharge through the motor windings since they have saturated and the line power source charges up the capacitors in the opposite polarity again. The current then reverses once more through the main windings and the capacitors again provide the source of current through the main windings. This continues until the line voltage again changes polarity. As the line voltage amplitude continues to increase the volt-second of the line voltage plus that of the capacitors again are in phase and add until the volt-second capacity of the main windings and associated magnetic material are exceeded. The winding magnetic material again saturates and the inductance of the main winding decreases considerably again causing the capacitors to discharge through the winding. This process is repeated each half-cycle and results in the motor running at maximum flux density and thus maximum force, torque and horsepower.

The present invention allows for optimum flux density and since the voltage across each capacitor is usually higher (although it need not be) than the line voltage, the flux density in the stator core is relatively independent of the line voltage over fairly wide ranges of amplitude. Furthermore, each capacitor prevents excessive currents from passing through the motor winding when the magnetic material saturates since only the energy in the capacitor, i.e., $\frac{1}{2}CV^2$, can be transferred through the respective winding. This limited energy transfer, as governed by the capacitor value (farads) and the voltage across the capacitor (i.e., $\frac{1}{2}CV^2$) prevents excessive currents from the line through the main winding.

The result is an AC motor that will have speed variable characteristics, and will operate over wide ranges of input voltage and at a high efficiency with excellent operating characteristics. Since the capacitors limit the amount of energy transferred through the main winding each half-cycle, motor burn out is greatly reduced and in some configurations is not normally possible. In the case of motor overload all that will occur is that the motor will stall and the input power to the motor will be greatly reduced. This is due to the fact that the series capacitors will have a lower voltage across them than normal since the motor is not operating in the controlled phase, and the $\frac{1}{2}CV^2$ energy level is greatly reduced.

In a three phase motor the control windings provided on the stator core are connected in parallel with each of the three main windings and capacitors, and can provide considerably more starting torque for the motor. The control windings are generally of greater impedance than the main windings and therefore the curent through the control windings is relatively low compared, for example, with the main windings of an induction motor.

Furthermore, the control windings serve to limit the input current, because as the input voltage increases, or the motor speed increases, these windings begin to act as generator windings due to the back e.m.f. exceeding the input voltage, and generate a current which counteracts some of the current drawn by the main windings. This, of course, is made possible by the fact that the main windings are the primary source of power to the motor.

The radially adjacent windings are those which are coupled magnetically. In a three phase motor the adjacent control winding current leads the corresponding main winding current at no-load and is substantially in phase, and with increasing load become out of phase and increasingly leads towards a maximum 180° vectorial displacement.

With the windings of the main windings and the adjacently located control windings wound in the opposite sense, on low load the total net flux density is low and with increasing load the flux density increases as the vectorial direction of the current of the corresponding control winding changes.

The main and the control windings each define at least two magnetic poles, the centers of the poles of the main windings and the centers of the poles of the control windings magnetically overlap the respective poles.

In another preferred form of the invention the centers of the poles of the control windings are physically located substantially between the poles of the main windings thereby increasing the starting torque and the breakdown torque of the motor. In such an event the electrical vectorial representation of the currents of the corresponding adjacent main and control windings remains substantially unchanged. The physical and magnetic change provides greater symmetry. In some cases the mechanical slot configuration permits this physical and consequent magnetic location to be achieved only partially.

In yet a further preferred form of the invention, the control winding is wound radially outside of the main winding, such that the space between the main winding and the rotor minimizes the leakage reactance of the main winding.

DESCRIPTION OF THE INVENTION

Figures 1, 2:
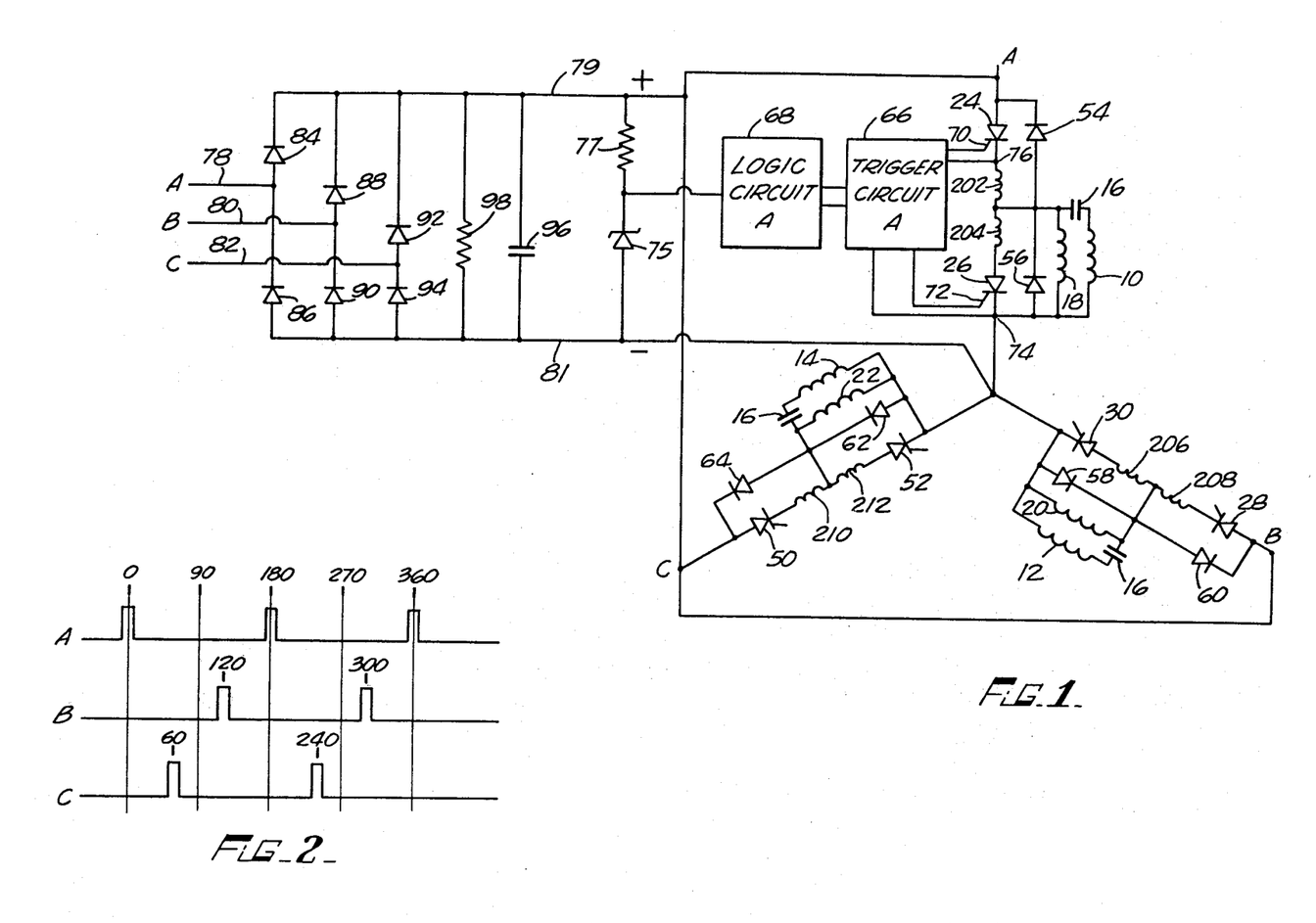
FIG. 1 is a schematic diagram of a preferred embodiment of a three phase motor illustrating the present invention.
FIG. 2 is an illustration of the timing of switching signals from the triggers circuit to the three phases of a three phase motor.

FIG. 1 illustrates in schematic form a three phase motor connected in wye configuration having the features of the present invention. There is shown the three windings 10, 12 and 14 of the main stator winding of an AC induction motor of the squirrel cage type which generally has a stator of magnetic material and a squirrel cage rotor. Neither the stator nor the rotor are shown but conventionally the motor has four poles although more or less pole pieces may be used if desired. The main stator windings 10, 12 and 14 are to provide the four poles as is described with reference to FIGS. 3 and 4 and there is provided in each of phases A, B and C a series capacitor 16. The capacitor 16 need have no particular value, but its capacitance must be large enough to maintain a capacitive power factor in the series circuit comprising this capacitor and the windings 10, 12 and 14 respectively during the motor's normal operating mode. Control windings 18, 20 and 22 are connected in parallel with windings 10, 12 and 14 respectively and capacitor 16. The windings 18, 20, and 22 are preferably of higher inductance and impedance than the winding 10, 12 and 14. They may, for example, have more turns of finer wire.

Connected with each series circuit of main winding and capacitor are a pair of silicon controlled rectifiers, 24 and 26 respectively for phase A; 28 and 30 respectively for phase B; and 50 and 52 for phase C. Across each SCR there are connected feedback diodes 54 and 56 in phase A; 58 and 60 in phase B; 62 and 64 in phase C. SCR 72 is connected in parallel with the series circuit of winding 10 and capacitor 16, and SCR 24 is in series with the series circuit. In phase B, likewise, SCR 30 is in parallel with the series circuit of main winding 14 and capacitor 16 and SCR 28 is in series with this series circuit. In phase C, likewise, SCR 52 is in parallel with series circuit of main winding 14 and capacitor 16 and SCR 50 is in series with this series circuit.

In series with each of the SCRs is an inductance 202 for SCR 24, inductance 204 for SCR 26; 206 for SCR 30; 208 for SCR 28; 210 for SCR 50 and 212 for SCR 52, the inductors acting to aid in turning-off the SCRs, the turning off being described more fully below.

There is also provided an external signal source being constituted for phase A by a trigger source or means being trigger circuit 66 connected with a logic circuit 68. The trigger circuit 66 is connected to the series circuit of main winding 10 and capacitor 16 at terminals 74 and 76. The logic circuit 68 controls the operation of the trigger circuit 66 and similar logic circuits and trigger circuits are supplied for phases B and C respectively. In some cases, a single logic circuit exists for all three trigger circuits 68. The logic circuit 68 is driven by a DC supply as determined by series circuit of zener diode 75 and resistor 77, the logic circuit being connected therebetween, and the zener diode 75 acting to clamp the DC voltage to the logic circuit 68 at a constant level.

The voltage on conductors 79 and 81 is a DC voltage which is supplied to the series circuit of the stator windings and capacitors, the control winding as described and the switching means. The DC supply is itself obtained from a conventional AC supply as indicated by conductors 78, 80 and 82 marked phases A, B and C which are fed to a full wave bridge rectifier which is constituted by diodes 84 and 86 for phase A; 88 and 90 for phase B and 92 and 94 for phase C. The output from the full wave rectifier as determined by the diodes is a clipped DC output. Capacitor 96 is a filter to this output, and it improves the DC output. Resistor 98 is a bleeder resistor to ensure that when the motor is switched off, it ensures that the capacitor 96 will become discharged.

In FIG. 2, there is illustrated the time sequence by which logic circuit 68 for phase A and similar circuits for phase B and C cause the trigger circuits of the respective phases to pulse sequentially to obtain a regular three phase supply, namely, with each phase 120° apart. Alternative pulses from the trigger source for each phase are directed alternatively to each SCR of each phase. Thus in phase A, for example, the pulses are alternatively directed to SCR 24 and SCR 26. The sequencing as illustrated would be, for phase A, the first pulse to SCR 24 and the second pulse to SCR 72, the pulses being at a 180° displacement. For phase B at 120° displacement, there would be a pulse for SCR 28 and at 300° displacement a pulse SCR 30. For phase C, there would be a pulse for SCR 52 at a 60° displacement, and for SCR 50 there would be a pulse at 240° displacement.

The triggering circuit 66 consists of a pair of relaxation oscillators (not shown in detail) which act so that when one of the oscillators is turned on, it triggers the one SCR 70 to switch on. Simultaneously the second SCR 72 is turned off as described more fully below. Diodes 54 and 56 act with the SCRs 70 and 72 respectively so that when the SCRs switch off, the current has a route for feedback. The waveform of the AC voltage at the SCRs 24 and 26 would be a positive pulse and negative pulse respectively so that the AC voltage across the series circuit of main winding 10 and capacitor 16 respectively would be a square wave.

Switching off the SCRs can be effected by the trigger circuit 66 or by the main winding 10 and capacitor 16 series circuit. In the latter case the circuit operates as follows: SCR 70 is triggered into a conductive state by the trigger circuit 66 which causes a current to flow in one direction. In this state, assume the winding 10 is saturated. As capacitor 16 begins to charge up with the positive polarity on the left hand plate, the current through winding 16 decreases until the magnetic material associated with this winding comes out of saturation. At this time, the charge on capacitor 16 is large enough to cause the current through the winding 10 to change direction since this capacitor voltage is greater than the DC source voltage. The current then changes direction and this reverse current flows through diode 54 and causes SCR 70 to turn off. This continues until trigger circuit 66 causes SCR 72 to be triggered on. This results in removing the DC source voltage that was opposing the voltage on the capacitor 16 which has the net result of suddenly adding a voltage equal to that of the source voltage to the voltage previously seen by the winding 10. The total voltage equal to that of the source voltage to the voltage previously seen by the winding 10. The total volt-seconds applied across the winding 10 soon exceeds the volt-second capacity of the winding 10 and its associated magnetic material and the latter saturates, causing a reduction in the inductance of the winding 10. The capacitor 16 then discharges through the winding 10. The capacitor 16 now begins to charge in the opposite polarity, i.e, the right hand plate becomes positive. When the capacitor 16 charges up in this new and opposite polarity, the current through the winding 10 decreases with the result that it goes out of saturation and into a higher impedance state. The current through the winding 10 then reverses as the right hand plate of capacitor 16 is positive relative to the left hand plate. This current passes through the diode 56 and causes SCR 72 to turn off.

This condition continues until trigger circuit 66 again triggers SCR 70 on. The DC source voltage is now added to the voltage on the capacitor 16 with the result that the volt-second capacity of the winding 10 and its associated magnetic material is exceeded and it again goes into saturation and the current flows as originally described. The cycle then repeats itself. The result is a self-communicating AC induction motor-inverter running from a source of DC power. As used herein the term AC voltage is thus intended to include both a normal line voltage and a voltage whose polarity is periodically reversed as by an inverter.

The speed of the motor is changed by the trigger circuits 66 and other trigger means being trigger circuits for phases B and C respectively. Inside each trigger circuit there are two transistors and a potentiometer for each of the trigger circuits. Varying the resistance of the potentiometer varies the gate bias of the transistor circuits and this changes the frequency of oscillation of the transistors. This changes the pulse rate to the two SCRs 70 and 72 respectively and the SCRs for the two phases B and C. A single control for all the potentiometers is provided so that the frequency change of all the triggers can be made simultaneously. The change in frequency of the AC across the stator permits change in motor speed. Thus the variable frequency trigger signal permits for a variable speed motor, as required.

The operation of the motor shown is as described above. Briefly, for phase A when a square wave AC voltage through switches 70 and 72 is applied to the winding 10 the capacitor 16 begins to charge and a current flows through the winding 10 and also through the winding 18. As the rotor speed and the back e.m.f. increase, the effective inductance of the winding 10 becomes such that this winding 10, together with the capacitor 16, goes into the operating mode. In other words, the effective volt-second capacity of the winding 10 and its associated magnetic material becomes sufficiently large enough to permit the operation of the device in the manner described previously, i.e., the capacitor 16 will periodically charge, discharge and recharge in the opposite direction causing the magnetic material associated with the winding 10 to switch from a non-saturated to a saturated condition while maintaining the average flux density quite large. The same effects will take place in each of the other phases B and C.

Figure 3:
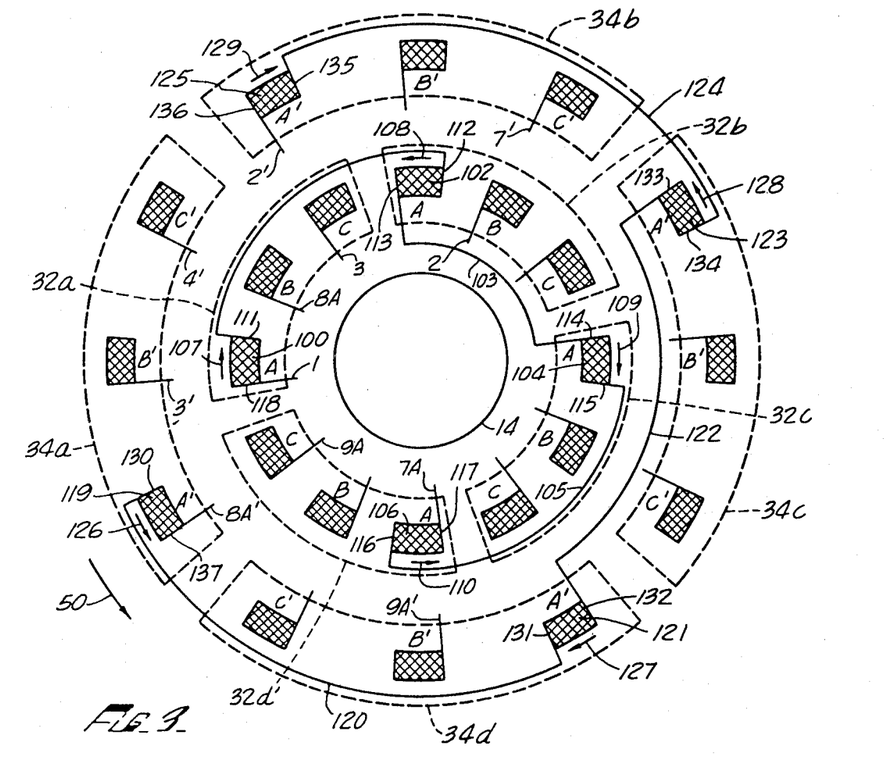
FIG. 3 is a physical representation of the windings of a three phase four pole motor according to the present invention.

Referring to FIG. 3 there is shown the relative physical disposition of twelve groups of coils which constitute the three phases of a motor, each phase having four spaced coil groupings thereby creating a 4-pole motor. The coil groups and poles of the main winding are depicted in clockwise rotation by numerals 1, 8A and 3 (representing phases A, B and C of the first magnetic pole); 4, 2 and 6 (representing phases A, B and C of the second magnetic pole); 7, 5 and 9 (representing phases A, B and C of the third magnetic pole); and 7A, 8 and 9A (representing phases A, B and C of the fourth magnetic pole). Located radially outside of the main windings are the control windings which define magnetic poles magnetically leading the main winding poles by substantially 90°. The order of the poles are such that the rotating fields created by the main windings and the control windings rotate in the same direction. The 90° magnetic leading is equivalent to an approximately 45° physical offset and the magnetic leading effect is illustrated by reading the windings in a counterclockwise sense as indicated by arrow 50. The coil groups and poles of the control windings viewed physically are in a clockwise sense depicted by numerals 8A', 3' and 4' (representing phases A, B and C of a first magnetic pole); 2', 6' and 7' (representing a second magnetic pole); 5', 9' and 7A' (representing a third magnetic pole); and 8', 9A' and 1' (representing the fourth magnetic pole).

The numerals of the main and control windings refer to the leads from the coil groups constituting a part of each winding, there being four coil groups for each winding of each phase.

The interconnection of the four coil groups constituting phase A of the main winding and phase A' of the control winding has been illustrated only. The lines interconnecting phases B and C of the main winding and B' and C' of the control winding have not been illustrated for the sake of clarity, but it would be clearly apparent to anyone skilled in the art how these windings would be connected after following the connections for phases A and A' which will now be described.

The coil groupings of phase A which constitute the main winding between leads 1 and 7A commence with coil grouping 100 which is connected by line 101 to coil group 102, which in turn is connected by line 103 to coil group 104, which in turn connected by line 105 to coil group 106, which has the free lead 7A'. Each of the coil groups in this example has three coils, and it will be seen that adjacent coil groups 100, 102, 104 and 106 are oppositely wound thereby to create opposite poles adjacent each other. Each of the three coils of each coil group is wound in the same sense. Arrows 107, 108, 109 and 110 respectively indicate the direction of the current of each coil group. Line 101 connects coil groups 100 and 102 at their trailing ends 111 and 112; line 103 connects coil groups 102 and 104 at their leading ends 113 and 114; and line 105 connects coil groups 104 and 106 at their trailing end 115 and 116. Leads 1 and 7A leave the coil groups 100 and 106 at the leading ends 117 and 118.

The control winding of coil groupings of phase A' is similarly connected between leads 8A' and 2'. Commencing from coil grouping 119, the line 120 connects coil group 121; line 122 connects coil group 121 to coil group 123; line 124 connects coil group 123 to coil group 125. Opposite currents are in radially adjacent windings as depicted by arrows 126, 127, 128 and 129, and a similar trailing and leading connection of the coil groupings as described above with regard to the main windings of phase A exist with regard to the control windings. Line 120 connects the trailing and 130 of coil group 119 with trailing end 131 of coil group 121; line 122 connects the leading end of 132 of coil group 121 with leading end 133 of coil group 123; line 124 connects the trailing end 134 of coil group 123 with trailing end 135 of coil group 125. Leads 8A' and 2' leave the coil group 119 and 125 from leading ends 136 and 137, respectively.

Similarly phase B is defined between leads 2 and 8A to the respective coil groups with lines interconnecting the other two coil groups of phase B similarly. Phases B' in the control winding is defined between leads 9A' and 3' to the respective coil groups with lines interconnecting the other two coil groups of B' similarly. Phase C is defined between leads 3 and 9A to the respective coil groups with lines interconnecting the other two coil groups of phase C similarly. Phase C' is defined between leads 4' and 7' to the respective coil groups of C' similarly. From the description of connecting the coil groups of phases A and A', it will be obvious to anyone skilled in the art how the coil groups of phases B, B', C and C are connected.

Figure 4:
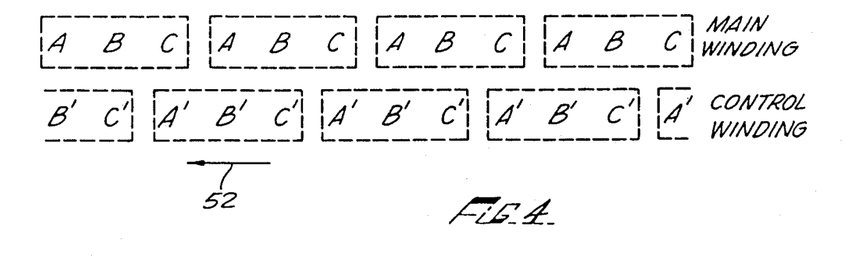
FIG. 4 is a linear representation of the coils of the windings of the three phase motor of FIG. 3 according to the present invention.

In FIGS. 3 and 4 the magnetic poles are indicated by the dashed lines 32a, 32b, 32c and 32d for the main windings and 34a, 34b, 34c and 34d for the control windings. FIG. 4 illustrates linearly the relationship of the various magnetic poles, and the coils constituting such poles. Arrow 52 indicates the direction of viewing the poles. The center of each pole of the main winding passes through phase B, and the center of the control winding poles pass through the winding B'. Between the phases C and A and C' and A', respectively, are the ends of each of the poles.

The rotor for the motor is indicated by numeral 200 and it will be seen that the main windings in the stator are closer to the rotor 200 and the effect of this is to reduce the leakage reactance of the main winding and thereby minimize losses. In the case where the control winding is located closest to the rotor there would be higher leakage reactance and possible lower efficiency, but the starting torque and breakdown torque would be higher.

The coils of the control windings are wound in an opposite sense to the windings of the main winding such that on no-load or low-load the fluxes generated by the winding of the main and control windings located physically below each other are opposed and the total net flux thereby produced is minimized. As the load increases the current of the control winding begins to lead the main winding current even further and, by virtue of the counterwound effect, this causes flux of the respective main and controlled windings to increase as their vectors approach an additive position.

In the motor of FIG. 3 therefore the alignment of the main winding phases and the corresponding control winding phases physically is:

| Main Winding: | A B C | A B C | A B C | A B C |
|---|---|---|---|---|
| Control Winding: | B'C'A' | B'C'A' | B'C'A' | B'C'A' |

Figure 5:
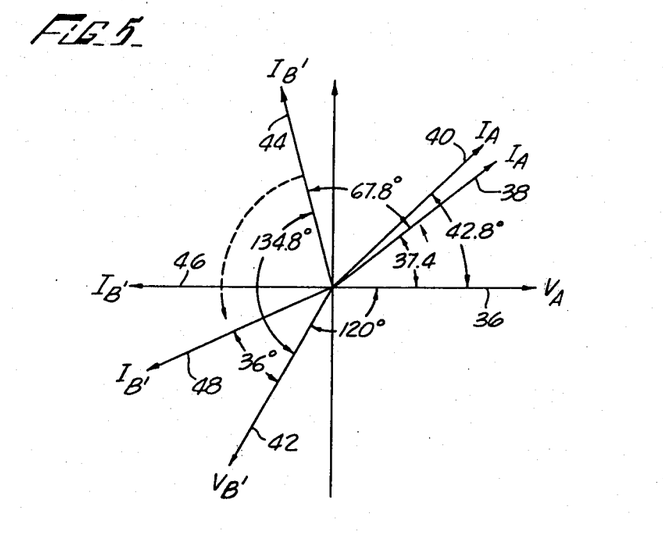
FIG. 5 is a vectorial diagram of the current and voltage characteristics of physically corresponding windings of the main winding and the physically corresponding auxiliary winding.

The vectorial representation of the voltage and current through the windings on one radial line is depicted in FIG. 5. Thus, in the main winding the voltage and current of phase A is illustrated and in the control winding the voltage and current of phase B' is illustrated the physical locations of these windings being opposite each other. Vector 36 indicates the voltage over the main winding of phase A and vector 38 the current in the phase A winding at no-load. As the load increases the current vector 38 moves to position 40 which represents the overload position. The rated load position is between vectors 38 and 40 but is not shown in the drawings. In the control winding of phase B vector 42 depicts the voltage across this winding which is displaced 120° from the voltage of phase A. At no-load the current is substantially in phase with the vector 38 as is indicated by vector 44.

"In-phase" in ideal situations would mean no phase displacement at all and as such a motor would operate efficiently at close to no load. In the sense used in this application "in-phase" must be considered of wider meaning depending on the particular motor itself. In preferred forms of the invention this angle will be between 0° and 60°. Preferably this would be less than 45°, which would be for a situation of a motor operating in a range from close to no load to rated load. Such a motor would have combined good close to no load characteristics and good full load characteristics. If the in-phase angle were greater than 60° the no load characteristics would deteriorate but efficiencies would improve at overload conditions. In FIG. 5, for example, the in-phase difference is illustrated as 67.8° at no load. As can be seen from the tables appearing later which refer to the same motor as depicted in the current relationships of FIG. 5 the optimum efficiency is shown at 25% overload. If optimum efficiency was required, for instance at 50% overload this low load phase angle defined above would be even greater than 67.8°.

As the load increases the angle of lead between $I_A$ and $I_{B'}$ moves to position 46 and the relative currents become out of phase. This angle approaches, but does not reach 180° and hence the vectorial sum of the current $I_A$ and $I_{B'}$ is reduced. In this manner the power factor of the motor is increased as the motor is loaded up to rated load. Similar vectorial representations and changes can be shown for the other adjacent phases, namely, B and C', and C and A', respectively.

This optimized flux density is achieved by physically locating adjacently the windings of phases A and B', B and C', C and A' in the manner shown in FIGS. 3 and 4, and employing the currents in these windings as depicted and described in connection with FIG. 5 to generate the consequent net flux by the adjacent windings A and B', B' and C', and C and A', respectively.

The flux density is optimized for the particular load conditions, as is reflected in the vectorial positions of $I_A$ and $I_{B'}$. This in turn minimizes the line current for the particular loading. Thus, flux density control results in minimized line currents necessary for particular loading conditions.

Comparatively, in a standard motor the flux density is relatively independent of load and thus the line current is substantially independent of load, there being less difference between no-load and full load. In the present invention, however, the flux densities are more load dependent and hence at lower load points there are reduced line currents, and this produces higher efficiency over the motor operating range and not solely about the rated load point.

Consequently, the motor of the present invention is one having higher efficiency and higher power factor over a far greater range than has previously been possible, and additionally has a speed variable characteristic as required.

It has also been found that the motor can operate above its rated load at higher efficiency than has previously been possible. In such an overload situation, the vectorial change of the current $I_{B'}$ is such as to change from the position 46 to the position 48. At this point the position of the vectorial displacement between $I_A$ and $I_{B'}$ is slightly less than 180°. Higher power factor and efficient operating conditions prevail.

In tests conducted with a Wanlass motor A18D2 Model F-4427, three phase, one horsepower, 230 volt running at 1755 RPM at rated load and having a breakdown torque of 148 inch lbs. the following relevant date was obtained. A 10 microfarad capacitor was connected in series with each main winding. At low load, the motor output was 0.057 horsepower, and the main windings drew some 510 watts of power while the control windings generated some 390 watts back into the system. This provided an overall efficiency of 35.4%. At 0.341 horsepower the main windings consumed 504 watts while the control windings generated 174 watts back into the system thereby giving a 76.8% efficiency. At rated load the main windings consumed 479 watts and the control windings changed their condition from that of being a power generator to that of being a power consumer, in fact consuming 368 watts, and the overall efficiency was some 87.3%. As the motor was run above rated load to 1.9 horsepower the control windings increasingly drew power and the efficiency became 84.6%. Overall the one horsepower motor effectively operated in the range of 0.5 horsepower to about 2 horsepower at an efficiency in excess of 82.1% which is an improvement over motors in the prior art. As the load of the motor increased, the current of the control windings changed its vectorial position as indicated earlier. Overall the power factor of the motor was in the range between 0.9 and 0.97.

In some forms of the invention it has been found desirable to increase the starting torque and the breakdown torque of the motor by improving the symmetry of the magnetic fields. The physical placement of the main and control windings relative to each other as depicted in FIGS. 3 and 4 does not provide an exact quadrature relationship physically and magnetically in the three phase, four pole motor. Such a physical quadrature relationship requires the center of the control windings to be between the poles of the main windings, and for this purpose it is necessary to move the windings relative to each other by some 30° electrical, namely, some 15° physical. Each slot in a conventional stator depicts a change of 20° electrical (10° physical) and hence in the tested motor the windings were moved over 20° electrical and not the 30° electrical which was physically impossible. This improved the alignment of the center of the poles of the control windings to a point close to the position between the poles of main windings, the misalignment being only some 10° electrical. The symmetry of the magnetic field was accordingly improved. The effect of this adjustment is to cause alignment of the main windings and control windings poles as follows:

| Main Winding: | A B C | A B C | A B C | A B C |
|---|---|---|---|---|
| Control Winding: | C' | A'B'C' | A'B'C' | A'B'C' | A'B' |

The above representation shows an exaggerated spacing between windings C and A, and C' and A', but it is useful in understanding that the center of the poles B and B', respectively, would now fall between the ends of the poles.

The effect of this change was to improve the starting torque and breakdown torque without detrimental effect on the remaining load range. In a tested motor the following parameters were achieved:

| | |
|---|---|
| Line Voltage | 230$^V$ |
| Capacitor in Main Winding | 10 Microfarad |
| Breakdown Torque 146 inch.lb | At 1203 RPM |
| Starting Torque | 119 inch.lb |
| Locked Rotor Total Current | 19.3 Amperes |
| Rated Load | = 36 inch.lb at 1755 RPM = 1.033 HP |
| Input Power | = 857 Watts |
| Efficiency | 87.3% |
| Power Factor | 0.94 |

The parameters of the motor when operated in overload conditions of 25% were:

| | |
|---|---|
| Line Voltage | 230$^V$ |
| Capacitor in Main Winding | 10 Microfarad |
| Breakdown Torque 146 inch.lb | At 1203 RPM |
| Starting Torque | 119 inch.lb |
| Locked Rotor Total Current | 19.3 Amperes |
| Overload of 25% | = 45 inch.lb at 1740 RPM = 1.243 HP |
| Input Power | = 1056 Watts |
| Efficiency | 87.8% |
| Power Factor | 0.95 |

The changeover of the control windings from a generative phase to a motoring phase occurred at approximately 24 inch. lb. This represented an overall increase in starting torque of some 23% and in breakdown torque of some 19% compared with the nonsymmetrical, physically unshifted motor described earlier.

In other examples of the motor or machine having a different number of magnetic poles, for instance, two poles or six poles the angular arrangements and vectorial representations would be different. Further the number of slots by which the windings of the motor would be moved to obtain optimum vectorial disposition would be different. Likewise, the number of phases of the machine would call for different parameters.

No attempt has been made to illustrate the manner in which the three coils of the polyphase main stator winding would be physically wound on the stator core as any conventional technique such as lap winding or concentric winding would be satisfactory as will be readily apparent to one skilled in the art. Similarly, the construction of the rotor has not been illustrated as any suitable rotor, i.e., a squirrel cage or wound rotor could be used.

In another example of the invention, motors could, for instance, be wired according to dual voltage techniques of double windings.

The invention also has application situations where existing motors are to be rewound and constructed in the manner herein described. In such a situation the standard motor frame provides a stator which has that quantity of magnetic material necessary for operation under existing standard design. However, when reconstructed in terms of the present invention and designed to operate at its rated output it will not be necessary to employ all the magnetic material which is available. In such examples the motor would be wound so that the voltage across the capacitor added to the input voltage will not cause the volt-second capacity of the core to be exceeded and not have the core operate periodically between saturated and non-saturated conditions. If the magnetic material in such an instance were used to its maximum capacity in accordance with the invention and the volt-second capacity of the core was exceeded periodically, then the overall rating of the motor would be higher than originally and this may be not as desirable for particular applications where a motor of rated output is required having only better power factor and efficiency characteristics than the standard motor and not increase horsepower output. An advantage of the present invention thus is also that existing motors may be reconstructed in accordance with the invention to operate periodically between saturation and non-saturation conditions and in the manner of the invention such that standard motor frame could now produce higher output and better power factors and higher efficiencies than has previously been possible.

It should be understood that while the foregoing description of the operation of the motor is believed to best describe the physical phenomena present in its operation, it is not meant in any way to limit the scope of the present invention, and that the operation of the motor or machine may some day be better explained.

The term "in-phase" has been explained above with regard to the vectorial position of the currents in the main winding and adjacent control windings. The term "out-of-phase" means a change from the normal "in-phase" status between the vectorial positions of these currents. Thus no limitation or value of angle can be imparted to define that vectorial position which will define "out-of-phase".

In the example described the control winding and series circuit constituted by the main winding and capacitor have been connected in parallel with each other under configuration. The invention would also operate for delta connections of the series circuit and parallel connected control winding, and also for different combinations of wye series circuit and delta control circuit, and vice versa.

In another example of the invention, there is provided a polyphase motor which does not have a control winding. In such a motor the efficiency may be relatively lower but the motor and its switching means would operate effectively to permit speed variability from close to zero speed to overspeed conditions. Such a motor does have the self-commutating effect that the motor with the control winding possesses.

Likewise, one particular form of switching means has been illustrated in combination with the windings of the motor, and clearly other forms of switching could operate with the windings of the machine and thereby cause a DC supply to be changed to a suitable AC supply at a requisite or variable frequency.

It should also be understood that the invention is not limited to the particular embodiments of the motor and machine illustrated and described. The foregoing description is thus meant to be illustrative and exemplary only and not restrictive.

I claim:
1. A polyphase electric motor comprising:
   a stator including a core of magnetic material;
   a rotor;
   a main polyphase stator winding having a winding for each phase wound on said core and encompassing said magnetic material;
   a plurality of input terminals adapted to be connected to a voltage source;
   a plurality of capacitors;
   means connecting the main windings of each phase in a series circuit with one of said capacitors and said series circuits being connected with said input terminals;
   a polyphase control winding having a winding for each phase wound on said core to encompass said magnetic material and connected respectively to said plurality of input terminals together with said main windings of each respective phase and the series connected capacitances in said series circuit, windings of the main winding being wound on the core radially adjacent to windings of the control winding;
   switch means for each winding of said main polyphase stator winding; and
   a trigger source for the switch means, the switch means being operative with the trigger source and the capacitor and each winding of said main polyphase winding to permit, on substantially low load, current flow in opposite directions across the radially adjacent windings of the main winding and the control winding, and such current flow becoming increasingly in the same direction as the load increases towards full load, the trigger source being operable at variable frequencies thereby to vary the motor speed.

2. A polyphase motor as claimed in claim 1, wherein said trigger source includes trigger means for each phase, and means for determining the firing of each trigger means sequentially thereby to generate the requisite phase relationship between the currents in the windings of each of the phases.

3. A polyphase motor as claimed in claim 2, wherein each trigger means is operable at variable frequencies thereby to vary the frequency of signals from the trigger means to the switch means, the operating frequency to the motor, and to the switch means, the operating frequency to the motor, and the motor speed.

4. A polyphase motor as claimed in claim 3, wherein each trigger means includes oscillator means, the oscillator means generating sequential pulses.

5. A polyphase motor as claimed in either claim 3 or claim 4, wherein the switch means and the capacitor and winding of each phase of the main polyphase stator winding develops an AC voltage source for the motor, said AC voltage being substantially a square wave.

6. A polyphase motor as claimed in claim 5, wherein the switch means for each winding of the main polyphase stator winding includes two series connected SCRs with diodes connected oppositely across each SCR, one SCR being series connected with each winding of the main winding and capacitor, and the other SCR being connected in parallel with each winding of the main winding.

7. A polyphase motor as claimed in claim 6, wherein the switch means for each winding of the main polyphase stator winding includes two series connected SCRs with diodes connected oppositely across each SCR, one SCR being series connected with each winding of the main windings and capacitor, and the other SCR being connected in parallel with each winding of the main windings.

8. A polyphase motor as claimed in claim 1, wherein the voltage source is a DC supply, and wherein there is rectifier means for obtaining said DC voltage supply from an AC voltage supply.

9. A polyphase electric motor comprising:
a stator including a core of magnetic material;
a rotor;
a main polyphase stator winding having a winding for each phase wound on said core and encompassing said magnetic material;
a plurality of input terminals adapted to be connected to a voltage source;
a plurality of capacitors;
means connecting the main windings of each phase in a series circuit with one of said capacitors, and said series circuits being connected with said input terminals;
a polyphase control winding having a winding for each phase wound on said core to encompass said magnetic material and connected respectively to said plurality of input terminals together with said main windings of each respective phase and the series connected capacitances in said series circuit, the windings of the main winding being wound on the core radially adjacent to the windings of the control winding, and said radially adjacent main windings and control windings being wound in an opposite sense,
switch means for each winding of said main polyphase stator winding; and
a trigger source for the switch means, the switch means being operative with the trigger source, the capacitor and each winding of the main polyphase winding to permit sequentially current flow in the windings of the main winding and the control winding, the trigger source being operable at variable frequencies thereby to vary the motor speed.

10. A polyphase electric motor as claimed in claim 9, wherein the trigger source includes trigger means for each winding of the stator main winding, said trigger means being operable at variable frequencies thereby to vary the frequency of trigger signals from the trigger means to the switch means, the operating frequency to the motor and the motor speed.

11. A polyphase electric motor comprising:
a stator including a core of magnetic material;
a rotor;
a main polyphase stator winding having a winding for each phase wound on said core and encompassing said magnetic material;
a plurality of input terminals adapted to be connected to a voltage source;
a plurality of capacitors;
means connecting the main windings of each phase in a series circuit with one of said capacitors and said series circuits being connected with said input terminals;
a polyphase control winding having a winding for each phase wound on said core to encompass said magnetic material and connected respectively to said plurality of input terminals together with said main windings of each respective phase and the series connected capacitances, the windings of the control windings and the main windings being wound such that on low load the total net flux density from the main and control windings substantially radially adjacent each other is low and with increasing load the total flux density increases as the flux generation of the radially adjacent windings become additive with each other;
switch means for each winding of the main polyphase stator winding; and
a trigger source for the switch means, the switch means being operative with the trigger source and the trigger source being operable at variable frequencies thereby to vary the motor speed.

12. A polyphase motor as claimed in claim 11, wherein each trigger means includes oscillator means, the oscillator means being adapted to generate sequential pulses, and the trigger means being adapted to generate the requisite phase relationship between the currents in the windings of each phase.

13. A polyphase motor as claimed in claim 12, wherein the switch means, the capacitor, and the winding of each phase of the main polyphase stator winding develops an AC voltage source for the motor, said AC voltage being substantially a square wave.

14. A polyphase motor as claimed in either claim 12 or claim 13, wherein the voltage source is a DC supply, and wherein there is rectifier means for obtaining said DC voltage source from an AC voltage supply.

15. A polyphase electric motor as claimed in claim 11, wherein the trigger source includes trigger means for each winding of the stator main winding, each trigger means being operable at variable frequencies thereby to vary the frequency of trigger signals from the trigger means to the switch means, the operating frequency to the motor, and the motor speed.

16. The motor as claimed in claim 11, wherein the windings of the main winding and the control winding each define several magnetic poles, the centers of the poles of the windings of the main winding magnetically overlap the magnetic poles of the windings of the control winding, and the centers of the poles of the windings of the control winding magnetically overlap the magnetic poles of the windings of the main winding.

17. The motor as claimed in claim 11, wherein the windings of the main winding and the control winding each define several magnetic poles, the centers of the poles of the windings of the control winding being magnetically located substantially between the poles of the windings of the main winding.

18. The motor as claimed in either claim 16 or claim 17, wherein the control winding is wound radially outside of the main winding such that the space between the main winding and the rotor substantially minimizes the leakage reactance of the main winding.

19. The motor as claimed in either claim 16 or claim 17, wherein the main winding is wound radially outside of the control winding, thereby to increase starting and breakdown torque.

20. The motor as claimed in either claim 16 or claim 17, wherein there are three phases, the phases of the main winding being designated by letters A, B and C and the phases of the control winding by letters A', B' and C', and wherein the substantial radial physical alignment of the phases of the main and control winding are AB', BC' and CA', respectively.

21. The motor as claimed in either claim 16 or claim 17, wherein there are three phases and the vectoral current relationship of the windings of the main winding with the current of the radially adjacent windings of the control winding on no-load is substantially in phase, and becomes increasingly out of phase on increased loading.

22. The motor as claimed in either claim 16 or claim 17, in which the windings of the main winding and the capacitors are connected in a Y-configuration, and the windings of the control winding are connected in a Y-configuration.

23. The motor as claimed in either claim 16 or claim 17, in which the windings of the main winding and the capacitors are connected in a delta configuration, and the windings of the control winding are connected in a delta configuration.

24. The motor as claimed in either claim 16 or claim 17, in which the windings of the main winding and the capacitors are connected in a delta configuration, and the windings of the control winding are connected in a Y-configuration.

25. The motor as claimed in either claim 16 or claim 17, in which the windings of the main winding and the capacitors are connected in a Y-configuration, and the windings of the control winding are connected in a delta configuration.

26. The motor as claimed in either claim 16 or claim 17, wherein the voltage source is a DC supply, and wherein there is rectifier means for obtaining said DC voltage supply from an AC voltage supply.

27. A polyphase electric motor comprising;
a stator including a core of magnetic material;
a rotor;
a main polyphase stator winding having a winding for each phase wound on said core and encompassing said magnetic material;
a plurality of input terminals adapted to be connected to a voltage source adapted to supply polyphase AC voltage;
a plurality of capacitors;
means connecting the main winding of each phase in a series circuit with one of said capacitors, and said series circuits being connected with said input terminals;
a polyphase control winding having a winding for each phase wound on said core to encompass said magnetic material and connected respectively to said plurality of input terminals together with said main windings of each respective phase and the series connected capacitances in said series circuit, the respective control windings of each phase being positioned on the stator so that the vectoral relationship of the currents of the main windings and the currents of the control windings located substantially radially adjacent the main windings cause the vectorial sum of the currents of the respective adjacent windings to decrease as the load increases towards full load;
switch means for each winding of the main polyphase stator winding; and
an external trigger source for the switch means, the switch means being operative with the trigger source, the capacitor and each winding of the main polyphase winding to develop a polyphase AC voltage and to permit sequentially current flow in opposite directions across the windings of the main winding and the respective radically adjacent windings of the control winding, the trigger source being operable at variable frequencies thereby to vary the motor speed, and
each of said capacitors being capable of being charged to a voltage sufficient, when added to said AC voltage, to develop a volt-second value across the magnetic material of said stator core greater than the volt-second capacity of said magnetic material so that said magnetic material will periodically be driven into saturation in opposite directions upon changes in polarity of the phases of said polyphase AC voltage.

28. The polyphase electric motor as claimed in claim 27, wherein said trigger source includes trigger means for each phase winding of the main stator winding, each trigger means being operable at variable frequencies thereby to vary the frequency of signals from trigger means to the switch means, the operating frequency to the motor, and the motor speed.

29. A polyphase electric motor comprising;
a stator including a core of magnetic material;
a rotor;
a main polyphase stator winding having winding for each phase connected to a voltage source;
a plurality of capacitors;
means connecting the main winding of each phase in a series circuit with one of said capacitors, and said series circuits being connected with said input terminals, said capacitors being capable of being charged so that the stator core will periodically change nonlinearly from non-saturated to a saturated condition;
a polyphase control winding having a winding for each phase wound on said core to encompass said magnetic material and connected respectively to said plurality of input terminals together with the said main windings of each respective phase and the series connected capacitances in said series circuit, the respective control windings of each phase being positioned on the stator so that the vectorial relationship of the currents of the main winding and the currents of the control winding located radially adjacent the main winding cause the total current of the respectively adjacent windings to decrease as the load increases towards full load;
switch means for each winding of the main polyphase stator winding; and
a trigger source for the switch means, the switch means being operative with the trigger source, the capacitor and each winding of the main polyphase winding to permit sequentially current flow in opposite directions across the windings of the main winding and the windings of the respective adjacent control winding, the trigger source being operable at variable frequencies thereby to vary the motor speed.

30. A polyphase electric motor as claimed in claim 29, wherein said trigger source includes trigger means for each phase winding of the main stator winding, each trigger source being operable at variable frequencies thereby to vary the frequency of signals from the trigger means to the switch means, the operating frequency to the motor, and the motor speed.

31. A polyphase electric machine comprising:
a stator including a core of magnetic material;
a rotor;
a main polyphase stator winding having a winding for each phase wound on said core and encompassing said magnetic material;
a plurality of terminals adapted to be connected to a voltage source;
a plurality of capacitors;
means connecting the main windings of each phase in a series circuit with one of said capacitors and said series circuits being connected with said input terminals;
a polyphase control winding having a winding for each phase wound on said core to encompass said magnetic material and connected respectively to said plurality of terminals together with said main windings of each respective phase and the series connected capacitances, the windings of the main winding being wound on the core radially adjacent to windings of the control winding;
switch means for each winding of the main polyphase stator winding; and
a trigger source for the switch means, the switch means being operative with the trigger source, and the capacitor and each respective winding of said main polyphase winding to permit, on substantially low load, current flow in opposite directions in the radially adjacent windings of the main winding and the control winding and such current becoming increasingly in the same direction as the load increases, the trigger source being operable at variable frequencies to vary the machine speed.

32. A polyphase machine as claimed in claim 31 including logic circuitry adapted to determine the firing of said trigger source, said trigger source including trigger means for each phase, and said circuitry being adapted sequentially to generate the requisite phase relationship between the currents in the windings of each phase, and wherein each trigger means is operable at variable frequencies thereby to vary the frequency of the trigger signals to the switch means, the operating frequency, and speed of the machine.

33. A polyphase machine as claimed in either claim 31 or 32 wherein the radially adjacent control windings and the main windings are wound in an opposite sense.

34. A polyphase electric motor comprising:
a stator including a core of magnetic material;
a rotor;
a main polyphase stator winding having a winding for each phase wound on said core and encompassing said magnetic material;
a plurality of input terminals adapted to be connected to a voltage source;
a plurality of capacitors;
means connecting the main windings of each phase in a series circuit with one of said capacitors and said series circuits being connected with said input terminals;
switch means for each winding of the polyphase stator winding;
trigger means for the switch means in each phase, the switch means being operative with the trigger source and the capacitor and each winding of said main polyphase winding to permit sequential current flow in opposite directions across each winding of the main polyphase winding;
logic means determining the firing of said trigger means sequentially to generate the requisite phase relationship between currents in the windings of each phase; and
each trigger means being operable at variable frequencies thereby to vary the frequency of the signals from the trigger means to the switch means, the operating frequency to the motor, and the motor speed.

35. A polyphase motor as claimed in claim 34, wherein the switch means of each winding of said polyphase main winding includes two series connected SCRs with diodes connected oppositely across each SCR, and SCR being series connected with the main winding and capacitor, and the other SCR being connected in parallel with the main winding.

36. A polyphase electric motor comprising:
a stator including a core of magnetic material;
a rotor;
a main polyphase stator winding having a winding for each phase wound on said core and encompassing said magnetic material;
a plurality of input terminals adapted to be connected to a voltage source;
a plurality of capacitors;
means connecting the main windings of each phase in a series circuit with one of said capacitors, and said series circuits being connected with said input terminals;
a polyphase control winding having a winding for each phase wound on said core to encompass said magnetic material and connected respectively to said plurality of input terminals together with said main windings of each respective phase and the series connected capacitances, windings of the main winding being wound on the core radially adjacent to windings of the control winding, and wherein the windings of the main winding and the control winding each define several magnetic poles, the centers of the poles of the windings of the main winding magnetically overlap the magnetic poles of the windings of the control winding, and the centers of the poles of the windings of the control winding magnetically overlap the magnetic poles of the windings of the main windings;
switch means for each winding of the main polyphase stator winding; and
a trigger source for the switch means, the switch means being operative with the trigger source, and the trigger source being operable at variable frequencies thereby to vary the motor speed.

37. A polyphase electric motor comprising:
a stator including a core of magnetic material;
a rotor;
a main polyphase stator winding having a winding for each phase wound on said core and encompassing said magnetic material;
a plurality of input terminals adapted to be connected to a voltage source;
a plurality of capacitors;
means connecting the main windings of each phase in a series circuit with one of said capacitors, and said series circuits being connected with said input terminals;

a polyphase control winding having a winding for each phase wound on said core to encompass said magnetic material and connected respectively to said plurality of input terminals together with said main windings of each respective phase and the series connected capacitances, windings of the main winding, being wound on the core radially adjacent to windings of the control winding, and wherein the windings of the main winding and the control winding each define several magnetic poles, the centers of the poles of the windings of the control winding being magnetically located substantially between the poles of the windings of the main winding;

switch means for each winding of the main polyphase stator winding; and a trigger source for the switch means, the switch means being operative with the trigger source, and the trigger source being operable at variable frequencies thereby to vary the motor speed.

38. A polyphase electric motor comprising: phase electric motor comprising:

a stator including a core of magnetic material;

a rotor;

a main polyphase stator winding having a winding for each phase wound on said core and encompassing said magnetic material;

a plurality of input terminals adapted to be connected to a voltage source;

a plurality of capacitors;

means connecting the main windings of each phase in a series circuit with one of said capacitors and said series circuits being connected with said input terminals;

a polyphase control winding having a winding for each phase wound on said core to encompass said magnetic material and connected respectively to said plurality of input terminals together with said main windings of each respective phase and the series connected capacitances, windings of the main winding being wound on the core radially adjacent to windings of the control winding, and wherein the respective control windings of each phase are positioned on the stator so that the vectorial relationship of the currents of the main winding and the currents of the control winding located radially adjacent the main winding cause the vectorial sum of currents of the respective radially adjacent windings to decrease as the load increases towards full load;

switch means for each winding of the main polyphase stator winding; and a trigger source for the switch means, the switch means being operative with the trigger source, and the trigger source being operable at variable frequencies thereby to vary the motor speed.

* * * * *